(12) United States Patent
Hampson

(10) Patent No.: US 6,473,720 B1
(45) Date of Patent: Oct. 29, 2002

(54) METHOD FOR MONITORING PRODUCT PERFORMANCE

(75) Inventor: Gregory James Hampson, Saratoga Springs, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 09/288,918

(22) Filed: Apr. 9, 1999

(51) Int. Cl.[7] .............................................. G21C 17/00
(52) U.S. Cl. ................................... 702/182; 700/97
(58) Field of Search ......................... 702/81, 84, 182; 700/95, 97, 109, 110, 117; 72/11.6

(56) References Cited

U.S. PATENT DOCUMENTS

| | | | | |
|---|---|---|---|---|
| 5,134,574 A | * | 7/1992 | Beaverstock et al. | 702/84 |
| 5,301,118 A | * | 4/1994 | Heck et al. | 700/109 |
| 5,311,759 A | * | 5/1994 | Magrulkar et al. | 72/11.6 |
| 5,339,257 A | * | 8/1994 | Layden et al. | 702/84 |
| 5,452,218 A | * | 9/1995 | Tucker et al. | 700/110 |
| 5,581,466 A | * | 12/1996 | Van Wyk et al. | 700/95 |
| 6,253,115 B1 | * | 6/2001 | Martin et al. | 700/97 |

* cited by examiner

*Primary Examiner*—Marc S. Hoff
*Assistant Examiner*—Mohamed Charioui
(74) *Attorney, Agent, or Firm*—Paul J. DiConza; Patrick K. Patnode

(57) ABSTRACT

An exemplary embodiment of the invention is directed to a method for monitoring performance of a product. In a design phase, a design for six sigma process is used to design the product and generate a plurality of design for six sigma elements representing characteristics of the product. The design for six sigma elements are stored in a design for six sigma database. In a service phase, performance of the product is monitored based on the design for six sigma elements stored in the design for six sigma database.

5 Claims, 1 Drawing Sheet

METHOD FOR MONITORING PRODUCT PERFORMANCE

BACKGROUND OF THE INVENTION

The invention relates generally to a method for monitoring product performance and in particular to a method for monitoring product performance using criteria derived through a design for six sigma (DFSS) process. An existing design practice is to design products in an attempt to achieve a six sigma quality level (less than 3.4 defects per 1 million parts). Design for six sigma (DFSS) is the process for creating quality in the product and for developing a "build & test plan" at the component, assembly, sub-system and finally product system level. The DFSS process utilizes a variety of quality concepts including defining critical to quality (CTQ) parameters or CTQ's. The CTQ's identify features of the product that should be present in order to meet customer requirements. A number of key control parameters (KCP's) are identified as having an effect on the CTQ's. Once the product is defined, the CTQ's are verified at all levels (component, assembly, sub-system and system). One form of CTQ verification is the control of the KCP's in the manufacturing process which insures manufacturing to the CTQ's.

In locomotive diesel engines, for example, one of the top level CTQ's is compliance with EPA required emissions levels. In other words, one of the customer's main requirements is that the engine complies with EPA emission levels. Failure to meet the emissions levels for new products will threaten the ability to sell the product. In addition, the customer has efficiency or specific fuel consumption (SFC) requirements. Utilizing the DFSS process creates a list of key control parameters, such as compression ratio, manifold air pressure and temperature, start of injection timing and fuel injection quantity, which can and should be controlled at the point just before the engine/locomotive is tested for EPA and SFC compliance. Using the DFSS process generates a database of key control parameters that insures compliance with the EPA requirements and creates the highest SFC for a given product. Deviation of the design from the developed database will indicate a manufacturing failure.

BRIEF SUMMARY OF THE INVENTION

An exemplary embodiment of the invention is directed to a method for monitoring performance of a product. In a design phase, a design for six sigma process is used to design the product and generate a plurality of design for six sigma elements representing characteristics of the product. The design for six sigma elements are stored in a design for six sigma database. In a service phase, performance of the product is monitored based on the design for six sigma elements stored in the design for six sigma database.

BRIEF DESCRIPTION OF THE DRAWINGS

Referring now to the drawings.

DETAILED DESCRIPTION OF THE INVENTION

Figure 1:
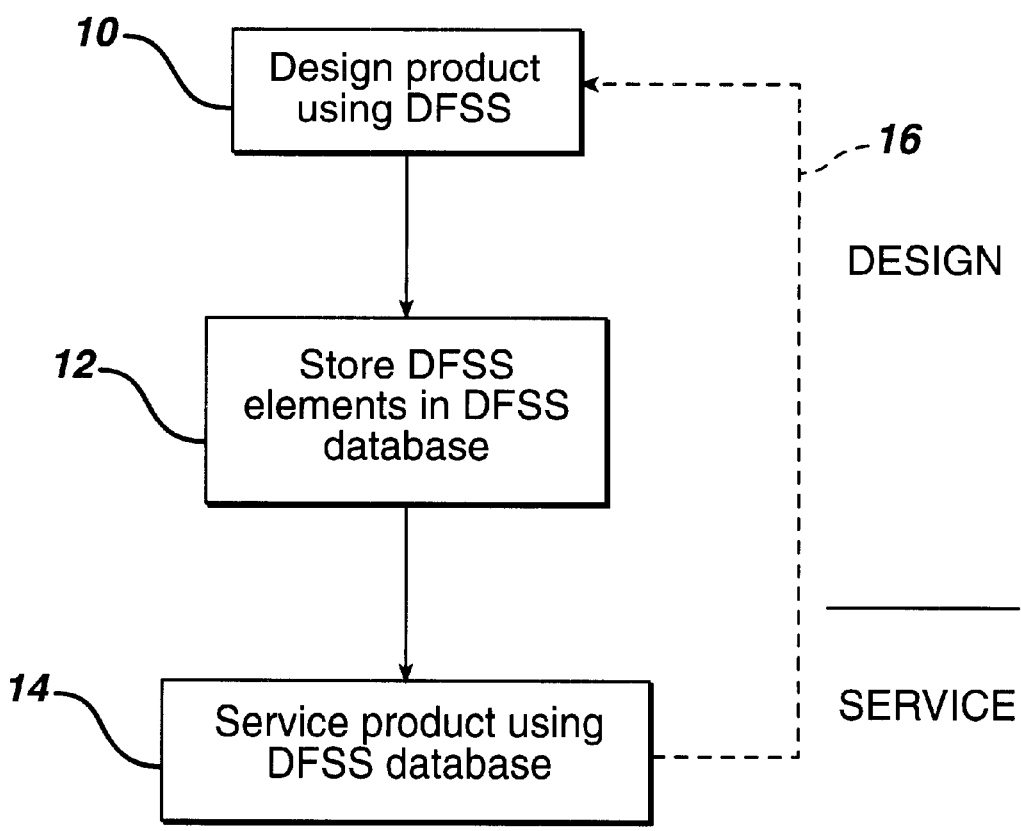
FIG. 1 is a flow chart of a method of monitoring product performance in an exemplary embodiment of the invention.

An exemplary embodiment of the present invention is a method for monitoring product performance. The term "monitor" is intended to have a broad meaning and includes monitoring, diagnosing, inspecting, etc. During a design for six sigma (DFSS) design phase a database is created including a plurality of DFSS elements which may later be used to monitor product performance during a service phase. FIG. 1 is a flowchart of the process in an exemplary embodiment of the invention. The process is divided into two phases, namely the design phase and the service phase. In the design phase, the product is designed using design for six sigma techniques as shown at step 10. A number of DFSS elements, described in detail below, are generated during the design for six sigma process. At step 12, DFSS elements are stored in a DFSS database that will be used in the service phase to monitor product performance. Once the database is generated, it may be used in a service phase to provide for monitoring of product performance as shown at step 14. Accordingly, the product performance is monitored based on the engineering process used to design, build and first test the product.

During the service phase, information about the product may be developed that is useful in designing second generation products. For example, monitoring the product in the service phase may yield information concerning the operating environment of the product which could be used to improve the design. Thus, information from the service phase may be used in subsequent design phases as represented by the dashed line 16.

The database created in step 12 may include a number of DFSS elements. One DFSS element in the database may be DFSS design score cards. The DFSS design scorecards may list the key control parameters, their mean values, standard deviation, lower specified limit (LSL), upper specified limit (USL) and Z value. The Z value is a measure of how frequently the key control parameter is outside the LSL to USL range. A Z value of 6 indicates that the key control parameter is outside the LSL to USL range 3.4 times out of one million opportunities. The DFSS scorecard may include a Z value for each key control parameter and a total Z value for all the key control parameters representing how well the entire system meets all the LSL's and USL's.

During the service phase, sensed key control parameters are measured and the mean and standard deviation are determined. The sensed key control parameter is compared to the as-designed LSL and USL to determine a sensed Z value. If the sensed Z value differs from the acceptable Z value by a predetermined amount (e.g. 5%), then service is recommended.

It should be noted that not all key control parameters can be sensed during the service phase. Accordingly, transfer functions are used to determine critical to quality parameters during service. For example, the compression ratio may not be sensed during the service phase. Nevertheless, expected variation in the compression ratio is known from the design phase. The expected critical to quality parameter (e.g., SFC) can be expressed as a range of acceptable values. The derived SFC, based on a subset of sensed key control parameters, is compared to an expected distribution to determine if performance is acceptable.

Another element in the DFSS database may be a list of key control parameters and the Z value for each key control parameter. In the DFSS process, key control parameters are defined for each level of the product. The key control parameters are those variables that need to be controlled in order to meet the CTQ's. Referring to the diesel engine example, the key control parameters may include compression ratio, manifold air pressure and temperature, start of injection timing and fuel injection quantity in order to meet the EPA emission requirements. To monitor quality of a product, the values of the key control parameters are compared to sensed values to confirm that the product is operating under ideal conditions. For example, the compression ratio of the diesel engine may be sensed and the sensed value compared to the corresponding key control parameter design specification. If the sensed value deviates from the key control parameter design specification by more than a predetermined limit, this indicates that the CTQ's may not be met and product service is required.

Including the key control parameters in the DFSS database allows for simplified monitoring of product performance. Performance of a product may be determined on a predetermined result being obtained. In the diesel engine example, performance is acceptable if the engine meets EPA emission requirements. Using conventional techniques, testing an engine for compliance would require mounting a sensor to monitor the engine emissions. Such a sensor may be inaccurate or not be suited for the environment. Compliance with emission requirements can be confirmed by confirming that key control parameters are within certain levels. For example, if the key control parameters of compression ratio, manifold air pressure and temperature, start of injection timing and fuel injection quantity are within predetermined levels, then the emissions are deemed acceptable.

Another DFSS element that may be in the DFSS database are the tools used to derive the key control parameters and CTQ's. Exemplary tools include behavior scenarios, quality function deployment (QFD) and analysis results. During design, tools are used to simulate different scenarios (e.g., diesel engine operating at a high altitude) and the tools sort through hundreds of parameters to define a list of key control parameters for each scenario. During service, the service computer can determine which scenario is relevant and then locate the DFSS scorecard relevant to this scenario. The scorecard contains the key control parameters to be monitored for a given scenario. The specified key control parameters may then be monitored and compared to key control parameter limits as described herein.

Another DFSS element that may be in the DFSS database are transfer functions that were used to determine the CTQ trade-off in the design phase. The transfer functions are mathematical equations that describe the product response to predetermined input data. The transfer functions may correspond to any level of the product including a component, an assembly, a sub-system or the entire system. The transfer functions can be used to monitor product performance by comparing actual product performance (e.g., measured with sensors) to predicted product performance (e.g., generated by transfer function). For example, diesel engine fuel consumption could be measured and compared to predicted fuel consumption generated by the engine transfer function. A difference between the actual fuel consumption and predicted fuel consumption indicates that the engine is not operating under ideal conditions and that service may be necessary.

Another DFSS element that may be in the DFSS database are test results used to verify the transfer functions and CTQ verification assurance. The test results include measurements of key control parameters made during the design phase. The measurements are used to generate the mean and standard deviation in the DFSS scorecards described above. During service, the monitored key control parameters may be compared to the test results to determine normal or abnormal operation. For example, measured key control parameters may be compared to the list of test results. If the measured key control parameters do not fall within the distribution of test results, then service may be necessary.

Monitoring product performance may be done in a variety of ways. One technique is to monitor the product remotely using sensors on the product and transmitting the sensed data to an off-board computer that monitors product performance. The sensed data should correspond to at least one key control parameter that would indicate whether the product is meeting CTQ's. The drawback to total remote monitoring is that numerous sensors are needed and sensor reliability and accuracy becomes an issue. Alternatively, product performance could be monitored by service personnel during routine service checks. The service personnel would monitor key control parameters, through sensors, to determine if key control parameters are within specified limits. Yet another method may be a hybrid technique in which a limited number of sensors are used to monitor a subset of key control parameters. If one of the key control parameters in the subset exceeds a specified limit, then a notification is generated that the product needs service. The service may then be performed by service personnel during which all key control parameters may be evaluated.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for monitoring performance of a product comprising:

a design phase including:
using a design for six sigma process to design the product and generate a plurality of design for six sigma elements representing characteristics of the product, wherein said design for six sigma elements include a key control parameter, said key control parameter including a lower specified limit, an upper specified limit, and a Z value indicating how frequently the key control parameter exceeds the lower specified limit or the upper specified limit;
storing said design for six sigma elements in a design for six sigma database; and a service phase including:
monitoring performance of the product based on the design for six sigma elements stored in the design for six sigma database, wherein monitoring includes sensing a sensed key control parameter of the product, comparing the sensed key control parameter to the key control parameter, determining if said sensed key control parameter exceeds said lower specified limit or said upper specified limit, computing a sensed Z value for said sensed key control parameter indicating how frequently the sensed key control parameter exceeds the lower specified limit or the upper specified limit, and comparing the Z value to the sensed Z value.

2. The method of claim 1 wherein:

said design for six sigma elements include a total Z value based on a plurality of Z values; and said monitoring includes computing a plurality of sensed total Z values for a plurality of sensed key control parameters and comparing the total Z value to the sensed total Z value.

3. The method of claim 1 wherein:

said design for six sigma elements include at least one tool used in the design phase to derive the key control parameter.

4. The method of claim 1 wherein:

said design for six sigma elements include transfer functions used in the design phase to describe the product response to input data.

5. The method of claim 1 wherein:

said design for six sigma elements include test results obtained during the design phase, said test results including measurements of key control parameters.

* * * * *